United States Patent
Able et al.

(10) Patent No.: US 7,187,460 B2
(45) Date of Patent: Mar. 6, 2007

(54) HOST CONTROL OF PRINTER READY

(75) Inventors: Douglas Anthony Able, Shelbyville, KY (US); Kevin Dean Schoedinger, Nicholasville, KY (US)

(73) Assignee: Lexmark International, Inc., Lexington, KY (US)

( * ) Notice: Subject to any disclaimer, the term of this patent is extended or adjusted under 35 U.S.C. 154(b) by 839 days.

(21) Appl. No.: 09/932,647

(22) Filed: Aug. 17, 2001

(65) Prior Publication Data

US 2003/0035130 A1 Feb. 20, 2003

(51) Int. Cl.
*G06F 15/00* (2006.01)
*G06K 15/02* (2006.01)

(52) U.S. Cl. .................. 358/1.14; 358/1.15; 358/1.7

(58) Field of Classification Search .............. 358/1.7, 358/1.14, 1.15; 347/134, 162

See application file for complete search history.

(56) References Cited

U.S. PATENT DOCUMENTS

| | | | | |
|---|---|---|---|---|
| 5,241,349 A | * | 8/1993 | Nagasaka | 399/70 |
| 5,521,686 A | * | 5/1996 | Muto | 399/69 |
| 5,528,346 A | | 6/1996 | Kim et al. | |
| 5,636,332 A | * | 6/1997 | Hibino | 358/1.13 |
| 6,078,343 A | * | 6/2000 | Jordan | 347/188 |
| 6,359,642 B1 | * | 3/2002 | Smith et al. | 347/247 |

* cited by examiner

*Primary Examiner*—King Y. Poon
(74) *Attorney, Agent, or Firm*—John A. Brady

(57) ABSTRACT

Printer has a standby state in which the motor driving the laser scanning mirror is turned off immediately after a print job when another page is not ready. To increase operating speed, a signal to the printer starts a timer (Ready timer). When a page is printed, the timer is started and only when it reaches zero is the motor turned off. When data of a page is received by the printer and the Ready timer is non-zero, a sheet is immediately picked for printing.

17 Claims, 6 Drawing Sheets

HOST CONTROL OF PRINTER READY

TECHNICAL FIELD

This invention relates to printers which have an on-but-not-ready state and which receive print jobs from external sources. More specifically, this invention relates to improving time of printing by control of printer ready.

BACKGROUND OF THE INVENTION

Some prior printers remain active a set time after a page is printed. Also, printers typically automatically revert to a standby status at the end of each print job to save energy or to reduce noise or for both objectives. The fuser of a laser printer is at high temperatures during use and the temperature is reduced between print jobs to save energy.

Separately, the motorized scanning polygon mirrors of modern laser printers typically operate at tens of thousands of revolutions per minute. This creates a substantial audible effect that is undesirable when printing is not taking place. As a result, the motor driving the polygon mirror is turned off in many printers automatically when a print job is complete and no other print job is ready for the printer.

Whenever the motor is turned off, the time necessary to bring the motor back to operating speed becomes a factor in the time required by the printer to print the next page of a print job that subsequently becomes ready to print. In one laser printer operative at 30 pages per minutes, the time to bring the polygonal mirror to operating speed is at least 5.5 second.

A host system, such as a scanner, may deliver single pages or groups of pages as a single print job with a short delay between that and the next page or group of pages. During that delay a printer as described in the foregoing would begin reversion to the standby status. This entails considerable loss of time.

DISCLOSURE OF THE INVENTION

In accordance with this invention, the printer has a controller which can delay the start of reverting to standby. The host can provide a predetermined control signal calling for such a delay. Similarly, operator input to the printer can provide the control signal. The printer responds to such a signal by continuing in full ready for a predetermined time. Where the signal is based on scanned data, the signal from the host may define the predetermined time based on the speed of the scanner. This results in printing without waiting for the printer to return to its ready state.

To minimize wear on mirror bearings, the predetermined time may be selected to be less than the time for the mirror to slow and then return to operating speed in an amount that does not increase the total number of revolutions of the mirror

DESCRIPTION OF THE DRAWINGS

The details of this invention will be described in connection with the accompanying drawings, in which.

DESCRIPTION OF THE EMBODIMENTS

Printing System

Figure 1:
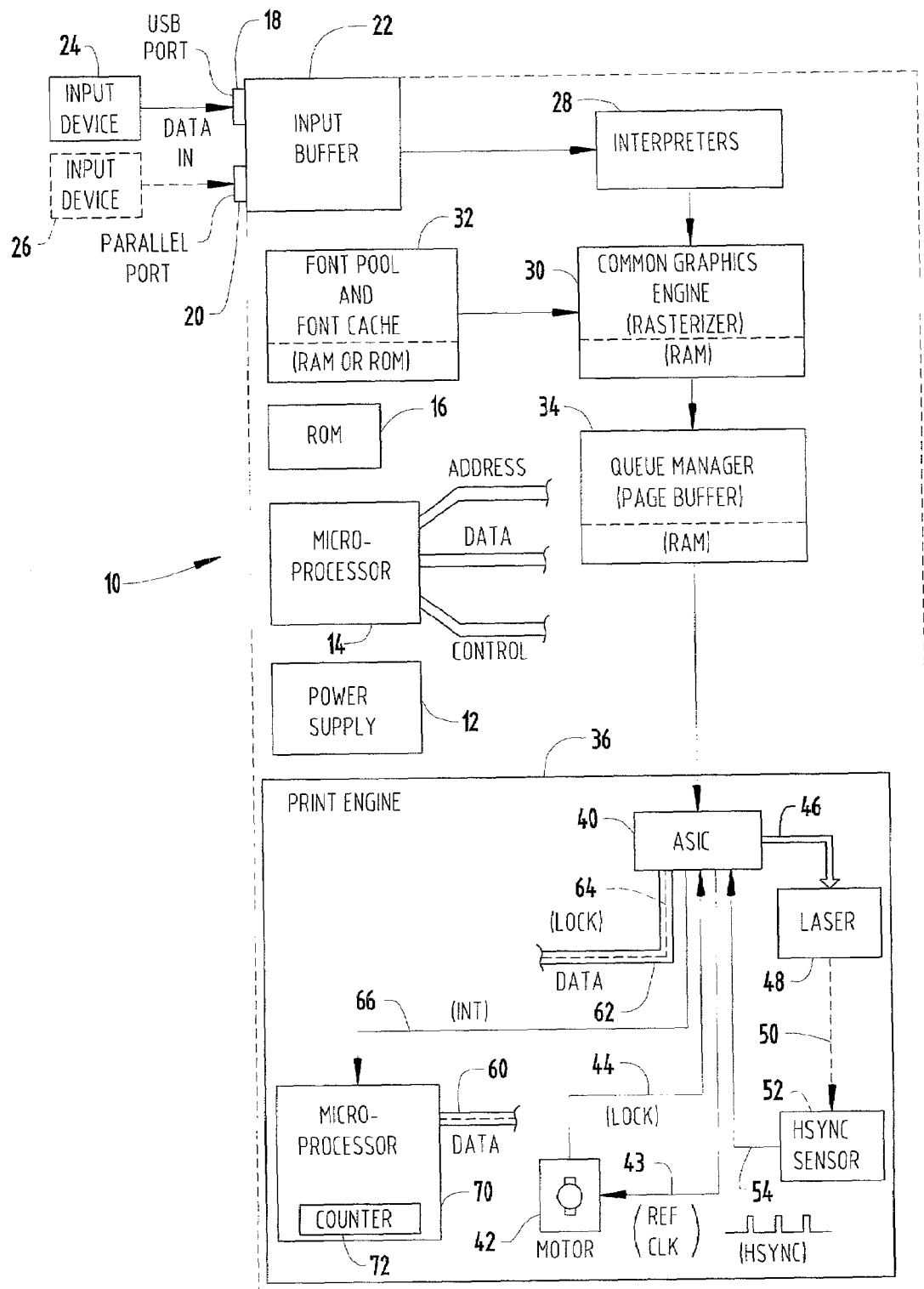
FIG. 1 is a hardware block diagram of the major components used in a laser printer which may incorporate this invention.

Referring now to the drawings, FIG. 1 shows hardware block diagram of a laser printer generally designated by the reference numeral 10. Laser printer 10 will preferably contain certain relatively standard components, such as DC power supply 12 which may have multiple outputs of different voltage levels, a microprocessor 14 having address lines, data lines and control and/or interrupt lines, Read Only Memory (ROM) 16, and Random Access Memory (RAM), which is divided into several portions for performing several different functions.

Laser printer 10 will typically contain at least one serial input, parallel input or USB port, or in many cases two types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. USB port 18 would typically be connected to a USB output port of a personal computer or a workstation that would contain a software program such as a word processor or a graphics package or computer aided drawing package. Similarly, parallel port 20 could also be connected to a parallel output port of the same type of personal computer or workstation containing the same type of programs, only the data cable would have several parallel lines. Such input devices are designated, respectively, by the reference numerals 24 and 26 on FIG. 1. Specifically, with respect to this invention, input device 24 or 26 may be a control system providing information from a scanner.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphic engine to be rasterized, which typically occurs in a portion of RAM designated by the reference numeral 30 on FIG. 1, employing font memories 32. Where the information is direct graphic information from a scanner, interpretation is minimal as such information is inherently rasterized or nearly rasterized.

Once the data has been rasterized, it is directed into a queue manager or page buffer, which is a portion of RAM, designated by reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes the laser light source within the printhead, and its output results in physical inking on a piece of paper or other media, which is the final print output from laser printer 10.

It will be understood that the address, data and control lines are typically grouped in buses, and which are physically communicated in parallel (sometime also multiplexed)

electrically conductive pathways around the various electronic components within laser printer 10. For example, the address and data buses are typically sent to ROM and RAM integrated circuits, and the control lines or interrupt lines are typically directed to all input or output integrated circuits that act as buffers.

Print engine 36 contains an ASIC (Application Specific Integrated Circuit) 40, which acts as a controller and data manipulating device for the various hardware components within the print engine. The bitmap print data arriving from queue manager 34 is received by ASIC 40, and at the proper moments is sent via signal lines 46 to the laser, which is designated by the reference numeral 48.

ASIC 40 controls the various motor drives within the print engine 36, and also receives status signals from the various hardware components of the print engine. A motor 42 is used to drive the faceted mirror (see the polygonal mirror 116 on FIG. 2), and when motor 42 ramps up to a rotational speed (i.e., its "lock" speed) that is dictated or measured by the frequency of the reference signal ("REF CLK") at a signal line 43, a "Lock" signal will be enabled on a signal line 44 that is transmitted to ASIC 40.

The lock signal may be dictated or controlled by various alternatives. Where the lock speed is to be different for different applications by the same printer 10, reference frequencies are supplied to track motor 42 that supports different lock speeds at different reference frequencies. Where only a single lock speed is to be employed by motor 42, the HSYNC signal (discussed below) may be supplied to motor 42 with a predetermined comparison to motor speed defining lock.

During conventional operation, once ASIC 40 receives the lock signal from motor 42, it transmits a corresponding lock signal (as part of a byte of a digital signal) along one of the data lines 64 of the data bus 62 that communicates with ASIC 40. Data bus 62 is either the same as the data bus 60 that communicates with microprocessor 70, or a portion thereof. When this lock status signal is received by microprocessor 70, microprocessor 70 initiates action of printer 1 leading to printing by printer 1 in normal course.

Figure 2:
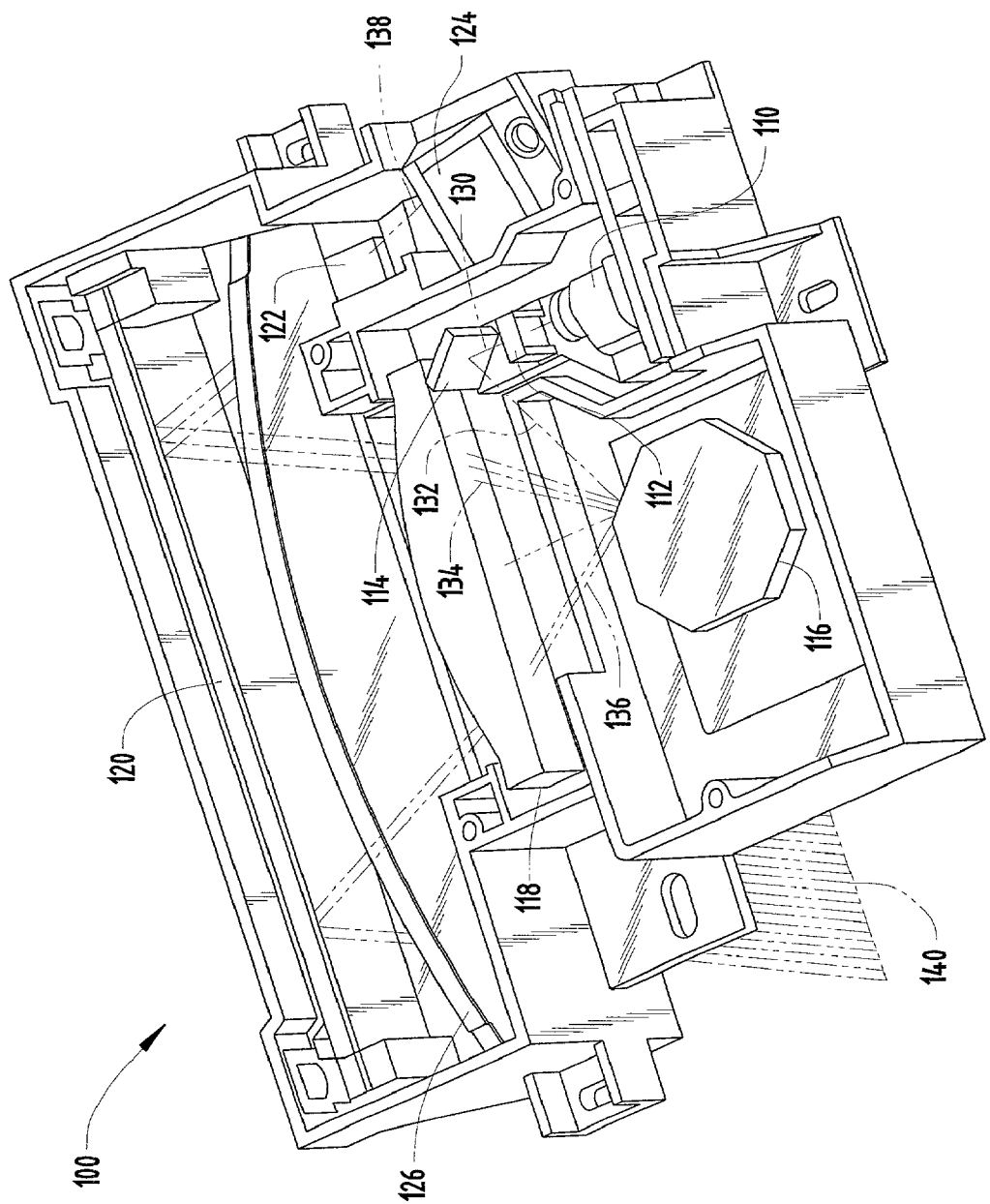
FIG. 2 is a perspective view in partial cut away of a laser printhead particularly showing the details of the light pathways from the laser.

FIG. 2 provides a perspective partially cut away view of some of the major components of a printhead 100 of laser printer 10. Starting at the laser light source 110, the light travels through a lens 112 along a pathway 130 and is redirected by a "pre-scan" mirror 114. The redirected light path, designated by a reference numeral 132, puts a spot of light on an eight-sided polygonal mirror 116. Some of the other major optical components within laser printer 10 include a lens 118, a "post-scan" fold mirror 120, a "start of scan" mirror 122, an optical sensor mounted to an HSYNC sensor card 124, and another lens 126 that directs the light into a "writing line" designated by the reference numeral 140.

A portion of the swept light that creates each raster scan is aimed by the polygonal mirror 116, lens 118, fold mirror 120, and a "start of scan" mirror 122 to create a light signal that follows the path designated by the reference numeral 138. Light that ultimately travels along path 138 will be directed to impact an optical sensor on the HSYNC sensor card 124, and the optical sensor is equivalent to the HSYNC sensor 52, seen on FIG. 1. In FIG. 2 since there are eight (8) facets or sides to polygonal mirror 116, each one-eighth rotation of mirror 116 will create an entire swept raster scan of laser light that ultimately becomes the writing line 140. For a small instant at the start of each of these scans, there will be a light beam that travels along path 138 to impact the HSYNC sensor 52 on the HSYNC sensor card 124. This HSYNC signal will be created during each scan at all times during normal operation of laser printer 10 when the printhead is running, even during scans in which there are no pels to be printed on the photoconductive drum. Laser source 110 is controlled such that it will produce no light at all for raster lines that are to be left blank on the final printed page, except for a brief moment at the end of each scan, so that the HSYNC signal will be produced at the beginning of each successive scan.

Figure 3:
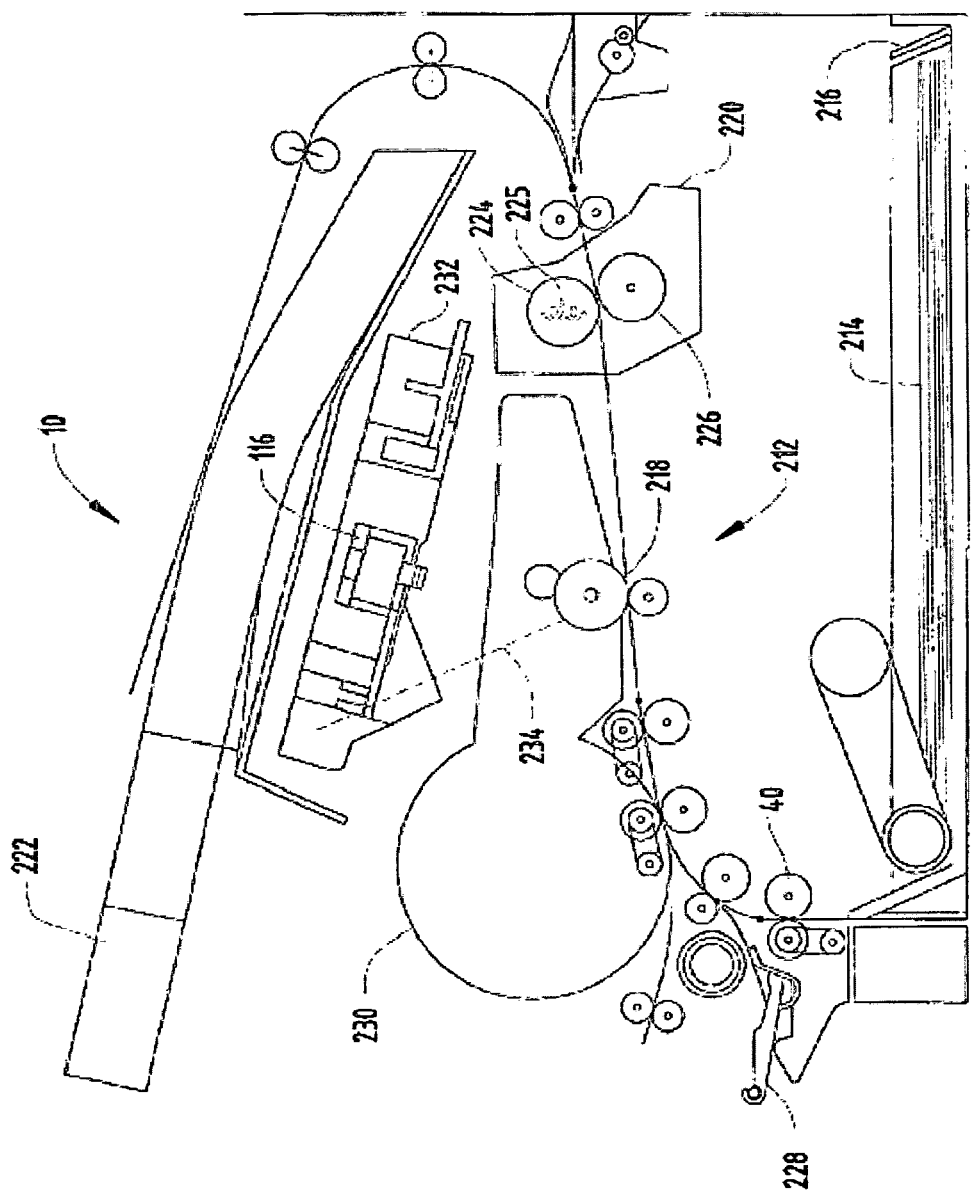
FIG. 3 is a cut away, diagrammatic side view of an electrophotographic printer.

Major elements of the printer as a whole are illustrated in FIG. 3. Printer 10 includes a media feed path 212 for feeding sheets of media 214, such as paper, from a media tray 216 past a photoconductive drum 218 and a fuser assembly 220 to an output tray 222. Fuser 220 is nip roller fuser, as is conventional, formed by a heated roller 224, which is heated to a high enough temperature to fix particles of electrophotographic toner to the sheets media 214 by melt flow. Roller 226 is a backup roller to apply some pressure during the fixing. Heating lamp 225 is inside roller 224 and powered by current from power supply 12.

Special media, such as envelopes and labels, are fed into the media feed path 212 from an external, front tray 228, sometimes referred to as a multi-purpose tray. Special media may also be fed from a separate, external tray (not shown). The photoconductive drum 218 forms an integral part of a replaceable toner cartridge 230 inserted in the printer 10. A printhead 232 is disposed in the printer 10 for scanning the photoconductive drum 218 with a laser beam 234 so that it ultimately sweeps or "scans" across a "writing line" on the photoconductive drum 218 as described in the foregoing, thereby creating in a black and white laser printer, a raster line of either black or white print elements, also known as "pels". Pivoted roller 236 feeds sheets from tray 216. Other nip rollers shown in FIG. 1 are sheet-feed rollers to feed paper or other media.

Control of Printer Ready

In one method the control signal from device 24 is a predetermined code embedded in a generally conventional PJL (Printer Job Language) command. The command signals that another print job (typically a single page) is to be expected, and specifies how long the printer should remain in the ready state. Alternatively, settings within the printer can specify the length of the wait.

When the printer 10 has such information indicating that it should expect another print page, the motorized scanning polygon mirror 116 is maintained at the printing speed after completion of the previous printed page. Thus the print engine remains in a "ready" mode until the data for the expected page is received. When the data is received, the print engine is not limited by the time that it would take to bring the motorized scanning polygon mirror 116 back to the printing speed. The remaining limiting factors to time to print are now only the ability of the mechanics to move the media through the print engine, and the ability of the fusing mechanism to reach operating temperature.

Of the remaining factors, when the time between printed pages is no more than a few seconds, only the ability of the mechanisms to move the media through the print engine is significant. Because the fusing mechanism was at operating temperature only a short time before, enough heat energy remains in the mechanism from the previous page printed that the time required to return to that temperature is negligible. Should a new fusing technology which does not have this characteristic be employed, one skilled in the art can see that it would be a straightforward extension of the invention disclosed to also keep the fusing mechanism in a "ready" mode during this wait time between print pages.

Factors within the printer require some limits on the amount of time that the control algorithm keeps the printhead in "ready" mode. As with many rotating mechanics, the motorized scanning polygon mirror employs a bearing which, depending on the particular technology used, may have factors which limit its reliable life.

One particular type of bearing which is employed in the motorized scanning polygon mirror of the same printers is a fluid bearing; a primary life-limiting factor of the fluid bearing technology is total number of revolutions. Another type of bearing which is employed in the motorized scanning polygon mirror of same higher speed printers is an air bearing; a primary life-limiting factor of air bearing technology is total number of start-stop cycles. Therefore, it is desirable for the control algorithm to operate in a manner which has a minimal negative impact on these factors, and even improves performance in these areas when possible. This invention meets both of these goals.

In the implementation, the fluid bearing sees no more total revolutions with this invention than it would without this invention, provided that the "ready" time is significantly less than the sum of the time that it takes for the motorized scanning polygon mirror to coast from operating speed to full stop plus the time that it takes to accelerate from stop to operating speed, as discussed immediately below. Similarly, in the implementation, the air bearing sees no more total start-stop cycles with this invention than it would without this invention because unnecessary stops of the motorized scanning polygon mirror are avoided. Thus for both the fluid and air bearing technologies, the life of the bearing is extended by the invention.

On a 30 ppm printer with a fluid bearing printhead, the motorized scanning polygon mirror rotates at approximately 30000 revolutions per minutes (RPM) or 500 revolutions per second and it takes 5.5 seconds to reach operating RPM from a full stop. Because the engine control has no information about the instantaneous rotational speed of the mirror when the motor is turned off, the control always assumes a full stop and allows the full 5.5 seconds to reach speed whenever the motor is started.

In order to compare the number of revolutions made by the polygon mirror both with and without this invention, a convenient interval is the time interval between a page being completed and a later page reaching the input sensor of the printer where imaging for that next page is started. Regardless of whether or not the invention is active, the mirror motor speed is the full operating RPM at each end of the interval. All differences between the two control mechanisms are contained within this interval.

Figure 4:
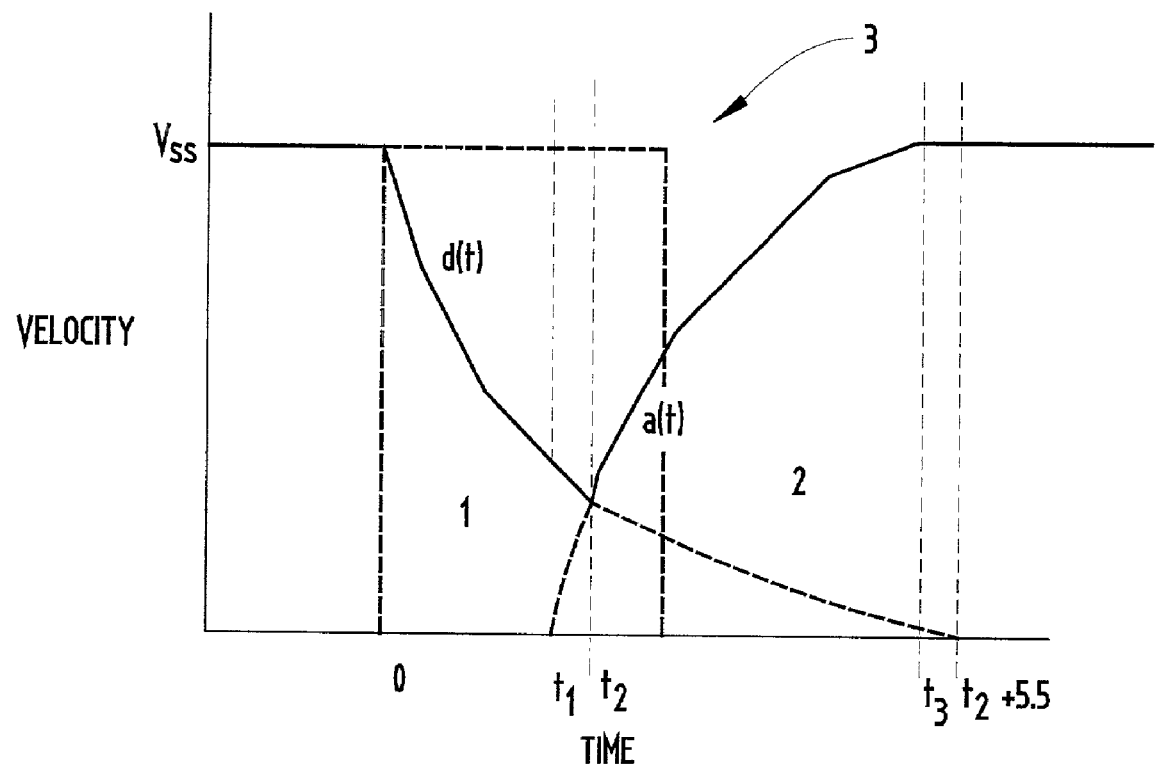
FIG. 4 illustrates the computation of total revolutions of the mirror.

Without the invention active, as soon as a page is completed with no page queued behind it the mirror motor is turned off and begins to coast down. If any subsequent page is received, as illustrated in FIG. 4, the mirror motor is restarted and the full 5.5 seconds is allowed for it to reach operating speed. The curve of FIG. 4 represents the velocity of the mirror motor during the aforementioned interval when the invention is not active. The deceleration of the motor once turned off from full operating velocity is characterized as d(t) and the acceleration of the motor once turned on from off is characterized as a(t). Time 0 is the point at which the first page is completed and the motor is turned off. Time $t_2$ is the point at which the next print page is received by the print engine and the motor is restarted. Time $t_2+5.5$ seconds is the end of the interval, being 5.5 seconds (the time required for the motor to accelerate from full stop to stable rotation) after the motor was re-started.

The number of revolutions of the mirror motor is the integral of this curve, which corresponds to the area under the curve.

Time $t_1$ represents the time at which the motor would have to be started from full stop in order to produce the acceleration profile shown. Time $t_3$ is the point at which the motor reaches steady-state velocity, which is 5.5 seconds from $t_1$ in this system.

In accordance with this invention, the motor is maintained at steady-state until the next page is received ($t_2$) plus a time for the sheet to be imaged to be moved to be imaged. That is assumed to be one second with respect to FIG. 4. The number of revolutions is the steady state velocity $V_{ss}$ times $t_2+1$. The rectangle 3 in FIG. 4, (heavy broken lines) representing that number of revolutions, is roughly equal to combined areas 1 and 2 (light lines at $t_2$ and $t_3$, heavy broken line at 0), under the curves shown in heavy outline, which are total revolutions absent this invention.

The acceleration and deceleration profiles for the foregoing mirror are approximated by the following polynomials:
Acceleration: $-490t^2+10544t$; and
Deceleration: $197t^2-4426t+30000$ (this being the steady state velocity)

This computed differences in total motor revolution between those from operation without this invention, described by the foregoing polynomials, and operation at continuing steady state in accordance with the invention results in a plot which is roughly linear between 4 seconds and 11 seconds. That plot shows a reduction in revolutions of about 1000 at 4 seconds, zero between 6 and 7 seconds, and an increase in revolutions of 2000 at 11 seconds. Of course, operation which increases revolutions is undesirable with respect to bearing wear. Operation at steady state with immediate printing in accordance with this invention is desirable with respect to bearing wear and occurs when the steady state is continued for about 6 seconds or less.

EXAMPLE

A printer having a fluid bearing mirror motor is used as part of a digital copy center. The time to first print from standby of the printer is 9.8 seconds (5.5 s printhead ramp time+4.3 s time from initial imaging to page in output tray.) (Initial imaging beings when the sheet is moved into place and the printhead "Lock" signal occurs. The sheet is moved from a tray or other input source typically during the printhead ramp time.)

The scanning device used in the digital copy center is capable of scanning 5 pages per minute. A user wishes to scan 2 pages for copying. Upon initiation of the copy job, the copy center controller sends a command indicating that the print engine should expect a job. This command is known as an "advance start", and is not part of the invention being disclosed. The first page is scanned in 12 (60/5) seconds and the print data is delivered to the print engine. The first page is delivered in 17.3 seconds (12 s delivery time+1.0 s feed time of sheet from tray+4.3 s time from initial imaging to sheet in output tray). (The feed time of sheet from its tray or other source may vary, depending on the location of the source. If no sheet follows, the time to output tray may be reduced by speeding up the final movement after imaging.)

The second page is scanned in another 12 seconds and the print data is delivered to the print engine 24 seconds after the initial start. Without the invention, the printhead was turned off at 17.3 seconds and the second print is delivered at 33.8 seconds (24 s delivery time+5.5 s printhead ramp time+4.3 s time from initial imaging to sheet in output). With the invention, the controller sends a command indicating that the print engine should expect another page within 12 seconds, and the second print is delivered at 29.3 seconds (24 s delivery time+1.0 s of feed time of second sheet from tray+4.3 s time from initial imaging second sheet to second sheet in output tray). Both performance and overall acoustics are improved.

By selecting "a ready" time of 8 seconds (slightly more than the nominal time needed of 7.7 seconds), the printer would be optimized for use in the copy center. This results in a small increase in revolutions, which is tolerable in view of the increased print speed. Within the printer, the "ready" is limited from being set to more than 15 seconds, a conservative approximation of a time which is significantly less than it takes for the motorized scanning polygon mirror to coast from operating speed to full stop plus the time that it takes to accelerate from stop to operating speed.

Implementation:

The default time for "ready" mode may be zero, which provides the general-purpose printing user with the maximum performance, for typical print jobs with the minimum of acoustical impact. If a value is entered into the printer's "ready" time setting, that value becomes the new default value. Data in the command from device 24 overrides the default value taken from the printer's "ready" time setting. The single exception is when the value passed from the application via the command is zero—in this case the zero is interpreted as instruction to apply a zero ready time after this page only, and revert to the default value henceforth.

Upon completion of any print page, a timer (termed Ready timer, not shown) is started which will count a time equal to the currently active "ready" time. Upon expiration of this timer, the printhead will be turned off. If the timer was initially started from zero, the default value will then be queued to be used as the ready time after the next sheet printed, otherwise the value just used will be queued.

Figure 5A:
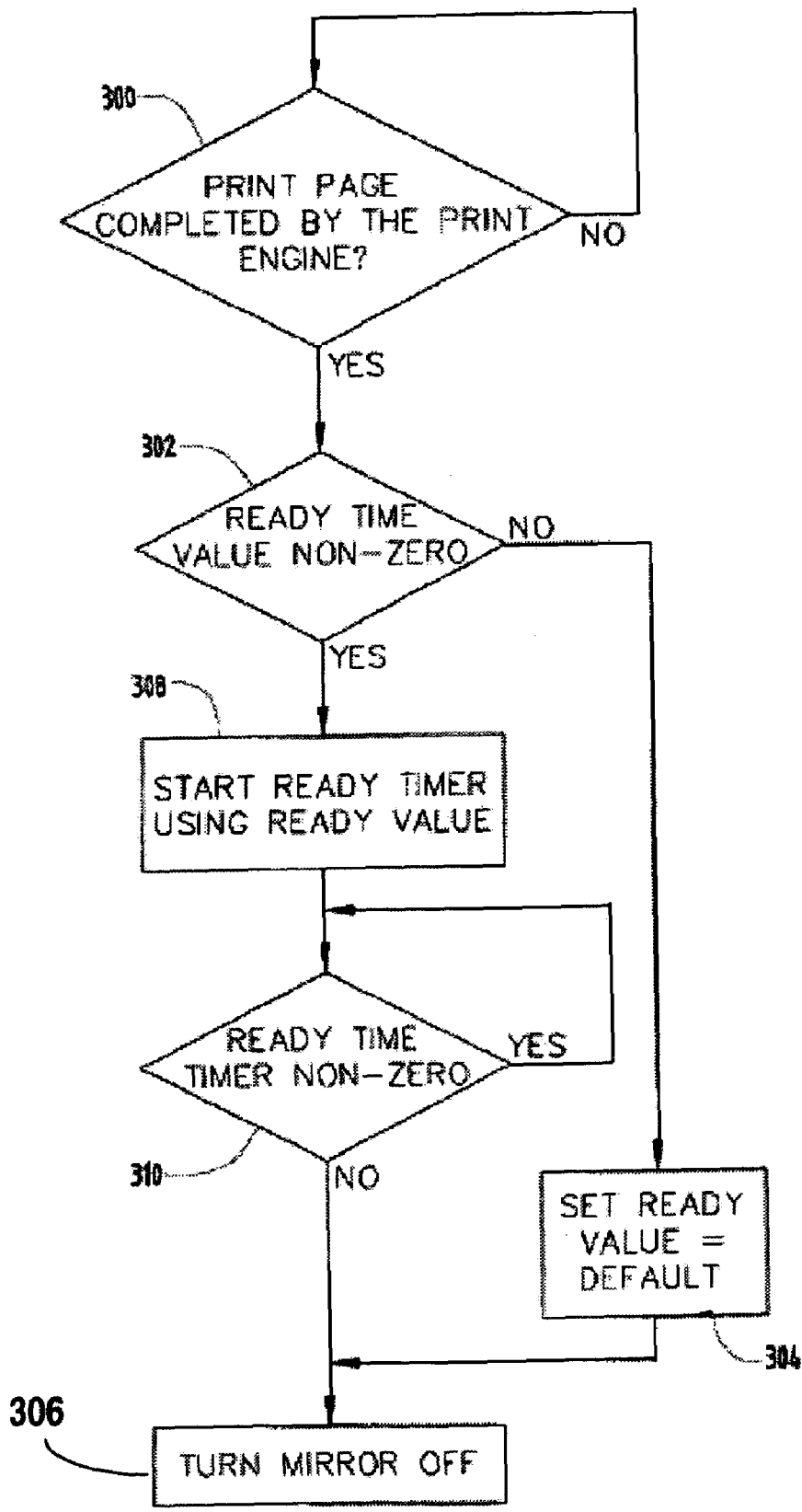
FIGS. 5a and 5b show a software implementation in the printer of the control functions of this invention.
Figure 5B:
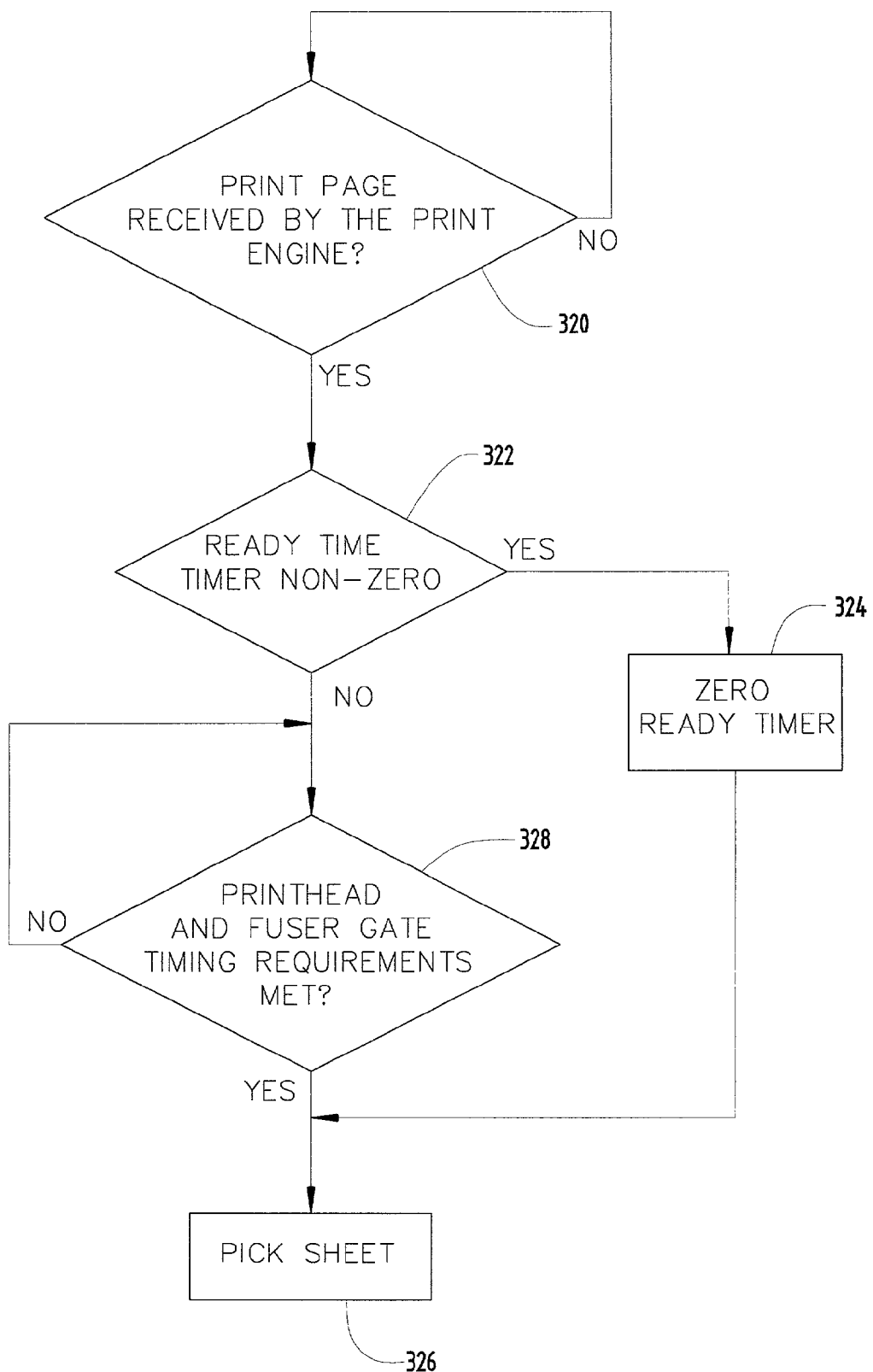

FIGS. 5a and 5b illustrate these control steps in some detail, all executed under control of microprocessor 72 or ASIC 40 or other automatic control apparatus. In decision 300 completion of printing a page is determined. If "No" this decision is made again at regular intervals. When "yes", the Ready timer is examined for being non-zero. If "No", the Ready value is set to the predetermined default in action 304 and the mirror 116 is turned off in action 306. (The Ready timer being non-zero means that the specified wait period has passed.)

When decision 302 is "Yes", the Ready timer is started in action 308 and decision 310 determines if the Ready timer is non-zero. If "Yes" this decision is made again at regular intervals. When "No," mirror 116 is turned off in action 306.

Subsequently, as shown in FIG. 5b, in decision 320, receipt of a page to be printed is determined. If "No" this decision is made again at regular intervals. When "Yes", the Ready timer is examined for being non-zero in decision 322. If "Yes", the Ready timer is set to zero in action 324 and a sheet is picked for printing in action 326. (The Ready timer being non-zero means that motor 116 is at full speed.)

When decision 322 is "No", printer initiation must be conducted, and decision 328 determines this status. When "No", this decision is made again at regular intervals. When "Yes", a sheet is picked for printing in action 326.

Thus, any time a page to be printed is received by the print engine, the timer value is checked. If the value is zero, then the printhead is not in the "ready" mode, and the sheet pick is gated by traditional means (max of printhead ready time, feed time, or fuser ready time). However, if the value is non-zero, the printhead is in the "ready" mode, and the sheet is picked immediately knowing that the printhead ready time is zero and assuming that the fuser time is negligible. When picking from the "ready" mode, the active timer is stopped, and the timer count value is forced to zero so that the printhead will not be stopped when the remainder of the time is elapsed (which would be likely during the middle of the next print operation).

SUMMARY OF THE INVENTION

By implementing a printhead idling mode which is of situation-dependent length, time to print performance of a laser printer can be improved in certain situations. This improvement is realized without loss of reliability of the printer or components therein, provided that realistic limits are placed on the amount of time that can be selected for the idling to be active. Typical printer users see no change in performance because they do not activate this "ready" mode with a non-zero time. Users with specialized needs who enable this "ready" mode (or users of applications with the capability of taking advantage of "ready" mode) benefit from improved time to print performance.

Overall improvements include:

Total job time can be reduced significantly.

Acoustics can become improved, i.e., less ramp up/downs of the mirror motor.

In most cases, printhead life can be increased independent of bearing type.

Flexible implementation allows driver to set optimum idle time for a given setup (as long as the time is within motor dependent boundaries).

Alternatives and variations will be readily apparent or can be anticipated employing printer control of reverting to standby.

What is claimed is:

1. A method of controlling a printer having a ready status and an on-but-not ready status and including a mirror having an operating speed comprising:
   indicating that a next print job will be received after a first print job and indicating a ready time within which said next print job is expected to be received;
   setting a ready timer to the lesser of:
   a) said ready time or
   b) a predetermined time interval that is a selected time less than the amount of time necessary for the mirror to coast from said operating speed to a full stop plus the amount of time necessary to accelerate from said full stop to said operating speed;
   starting said ready timer; and maintaining said printer in a ready status until said ready timer expires or said next print job is received, wherein if said ready timer expires changing said printer to said on-but-not-ready status allowing said mirror to coast to a stop.

2. The method as in claim 1 in which a predetermined signal comes from a host receiving page data scanned from scanned pages and said signal defines said ready time based in the time between said scanned pages.

3. The method of claim 1, wherein said ready timer is started upon the completion of any print page.

4. The method of claim 3, further comprising resetting said ready timer.

5. The method of claim 1, wherein a predetermined control signal is entered into said printer when print data is delivered to a print engine in said printer.

6. The method of claim 1, wherein said ready time is the amount of time for print data for said next print job to be received and a time for a sheet to be imaged to be moved to be imaged.

7. A system for controlling a printer having a ready status and an on-but-not ready status comprising:
a printer including a ready timer, a mirror having an operating speed and an automatic control apparatus; and
an input capable of entering a ready time within which a next print job is expected and a predetermined control signal into said printer;
wherein said automatic control apparatus is configured to:
start said ready timer for the lesser of said ready time or a predetermined time interval, wherein said predetermined time interval is a selected time less than the amount of time necessary for the mirror to coast from said operating speed to a full stop plus the amount of time necessary to accelerate from said full stop to said operating speed, when said predetermined control signal is entered into said printer,
and maintain said printer in a ready status until said ready timer expires or said next print job is received, wherein if said ready timer expires said control apparatus is configured to change said printer to said on-but-not-ready status allowing said mirror to coast to a stop.

8. The system of claim 7, wherein said automatic control apparatus is further configured to start said ready timer upon the completion of any print page.

9. The system as in claim 7, wherein said input comprises a host receiving page data scanned from scanned pages and said predetermined control signal defines said ready time based in the time between said scanned pages.

10. The system of claim 7, wherein said input is capable of entering said predetermined control signal when print data is delivered from said input to a print engine in said printer.

11. The system of claim 7, wherein said ready time is the amount of time for print data for said next print job to be received and a time for a sheet to be imaged to be moved to be imaged.

12. A printing apparatus having a ready status and an on-but-not ready status comprising:
a ready timer,
a mirror having an operating speed and
an automatic control apparatus;
wherein said automatic control apparatus is configured to:
start said ready timer for the lesser of: a ready time within which a next print job is expected or a predetermined time interval, wherein said predetermined time interval is a selected time less than the amount of time necessary for the mirror to coast from said operating speed to a full stop plus the amount of time necessary to accelerate from said full stop to said operating speed, and
maintain said printer in a ready status until said ready timer expires or said next print job is received, wherein if said ready timer expires said control apparatus is configured to change said printer to said on-but-not-ready status allowing said mirror to coast to a stop.

13. The printing apparatus of claim 12, wherein said automatic control apparatus is further configured to start said ready timer upon the completion of any print page.

14. The printing apparatus of claim 12, including an input comprising a host receiving page data scanned from scanned pages and a predetermined control signal defines said ready time based in the time between said scanned pages.

15. The printing apparatus of claim 14, wherein said input is capable of entering said predetermined control signal when print data is delivered from said input to a print engine in said printer.

16. The printing apparatus of claim 12, wherein said automatic control apparatus comprises a microprocessor.

17. The system of claim 12, wherein said ready time is the amount of time for print data for said next print job to be received and a time for a sheet to be imaged to be moved to be imaged.

* * * * *